US011030025B2

(12) United States Patent
Soman et al.

(10) Patent No.: US 11,030,025 B2
(45) Date of Patent: Jun. 8, 2021

(54) MANAGING INTER-PROCESS COMMUNICATIONS IN A CONTAINERIZED APPLICATION ENVIRONMENT

(71) Applicant: VMware, Inc., Palo Alto, CA (US)

(72) Inventors: Sisimon Soman, Sunnyvale, CA (US); Matthew Conover, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 92 days.

(21) Appl. No.: 15/600,007

(22) Filed: May 19, 2017

(65) Prior Publication Data
US 2018/0336079 A1 Nov. 22, 2018

(51) Int. Cl.
*G06F 5/06* (2006.01)
*G06F 9/54* (2006.01)
*G06F 9/455* (2018.01)

(52) U.S. Cl.
CPC .......... *G06F 9/548* (2013.01); *G06F 9/45504* (2013.01)

(58) Field of Classification Search
CPC ........ G06F 9/548; G06F 9/455; G06F 9/5005; G06F 9/546
See application file for complete search history.

(56) References Cited

U.S. PATENT DOCUMENTS

| 10,007,537 | B2* | 6/2018 | Emelyanov | G06F 9/455 |
| 2010/0082816 | A1* | 4/2010 | Kharat | G06F 9/4856 709/226 |
| 2010/0083283 | A1* | 4/2010 | Kharat | G06F 9/4856 719/319 |
| 2011/0161988 | A1* | 6/2011 | Kashyap | G06F 9/544 719/319 |
| 2015/0150003 | A1* | 5/2015 | Emelyanov | G06F 9/455 718/1 |
| 2016/0314076 | A1* | 10/2016 | Wibling | G06F 9/5016 |
| 2018/0349162 | A1* | 12/2018 | Tian | G06F 12/10 |

* cited by examiner

*Primary Examiner* — Doon Y Chow
*Assistant Examiner* — Abdou K Seye

(57) ABSTRACT

Described herein are systems, methods, and software to enhance the management of inter-process communications (IPCs) for containers according to an implementation. In one implementation, a container management service executing on a host with a plurality of containers may identify an IPC object generation with a first identifier from one of the containers. Responsive to the request, the service may translate the first identifier into a second identifier, and store the IPC object in a memory system using the second identifier. Once stored, requests may be made from applications in approved containers for the object using the first identifier, and the service may retrieve the IPC object using the second identifier.

18 Claims, 8 Drawing Sheets

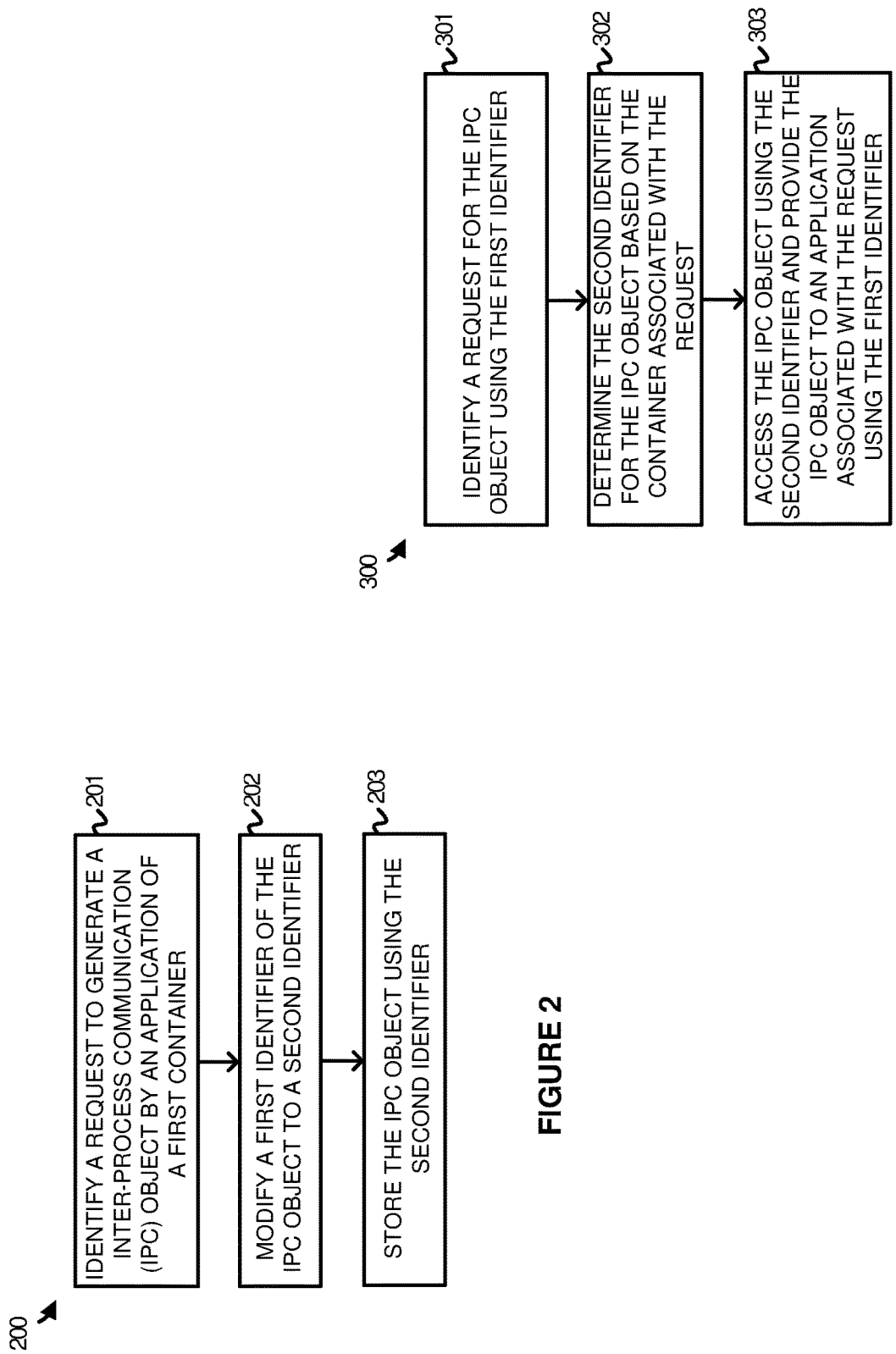

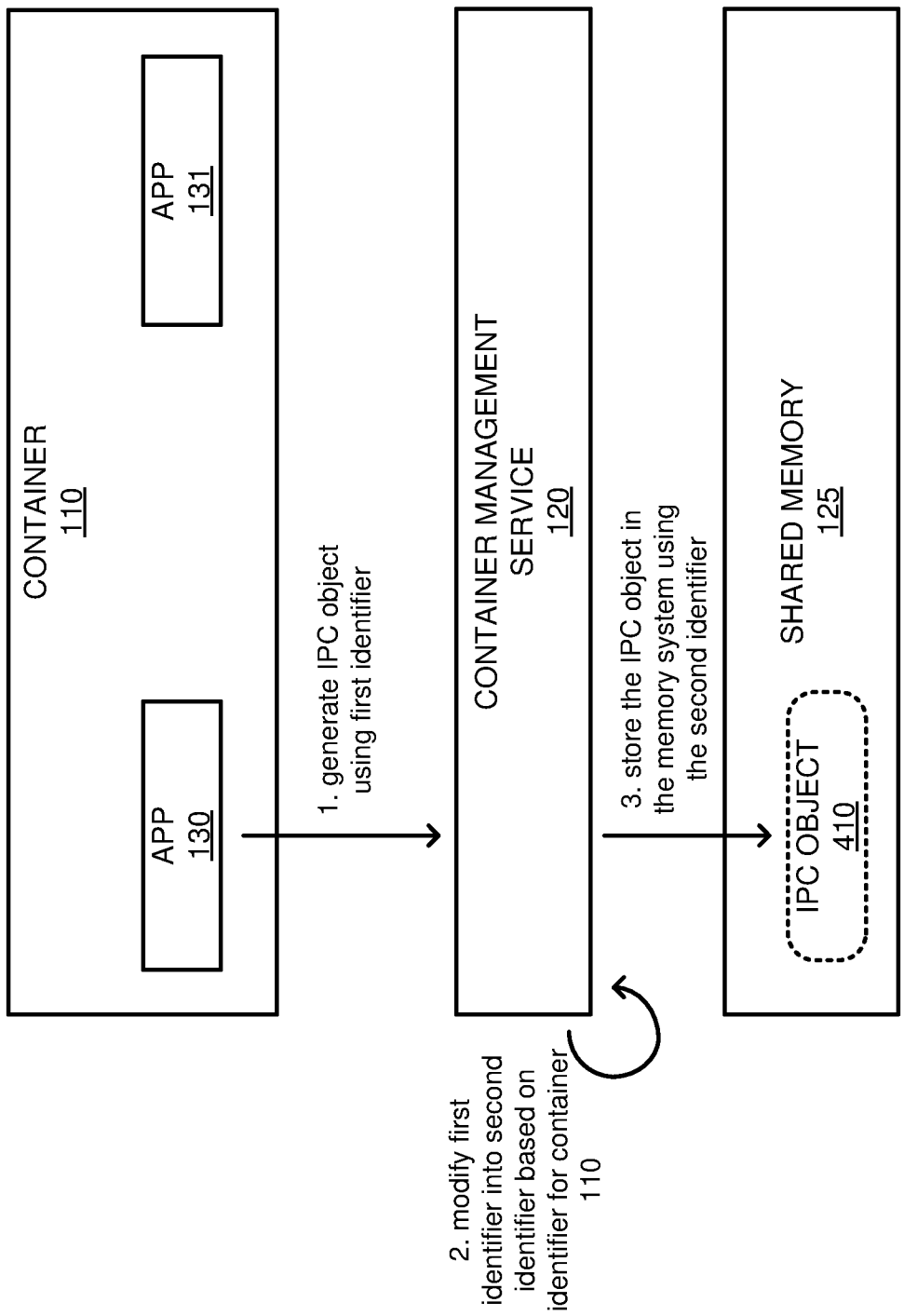

MANAGING INTER-PROCESS COMMUNICATIONS IN A CONTAINERIZED APPLICATION ENVIRONMENT

TECHNICAL BACKGROUND

Containers, such as Docker containers, Microsoft containers, and Linux containers provide an operating system level virtualization method for deploying and running applications without launching an entire virtual machine. Instead, containers permit isolated operations to be run on a single host and share a single operating system. To provide this operation, containers may include components necessary to run the desired software, such as files, environmental variables, and libraries, while the host (or container management service) constrains each of the container's access to physical resources, such as processing resources and memory.

Although containers provide an efficient method of using resources provided by a physical host computing system without requiring a separate operating system for each of the operations, managing security for each of the containers can be difficult and cumbersome. For example, it is often desirable to prevent or at least limit access to data from one application in a first container to an application in a second container. This problem escalates when services that are provided by the host operating system may be required by multiple containers, which can cause data to be made available to undesirable processes.

Overview

The technology disclosed herein enhances the management of inter-process communications (IPCs) in a containerized application environment. In one implementation, a container management service is configured to identify, from an application, a request for an IPC object using a first identifier for the IPC object, and determining a second identifier associated with the IPC object based on a container for the application. The container management service is further configured to access the IPC object in a memory system using the second identifier, and provide the IPC object to the application.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates an operation of a container management service to provide IPCs according to an implementation.

FIG. 3 illustrates an operation of a container management service to provide IPCs according to an implementation.

FIG. 4A illustrates an operational scenario of communicating an IPC object according to an implementation.

DETAILED DESCRIPTION

Figure 1:
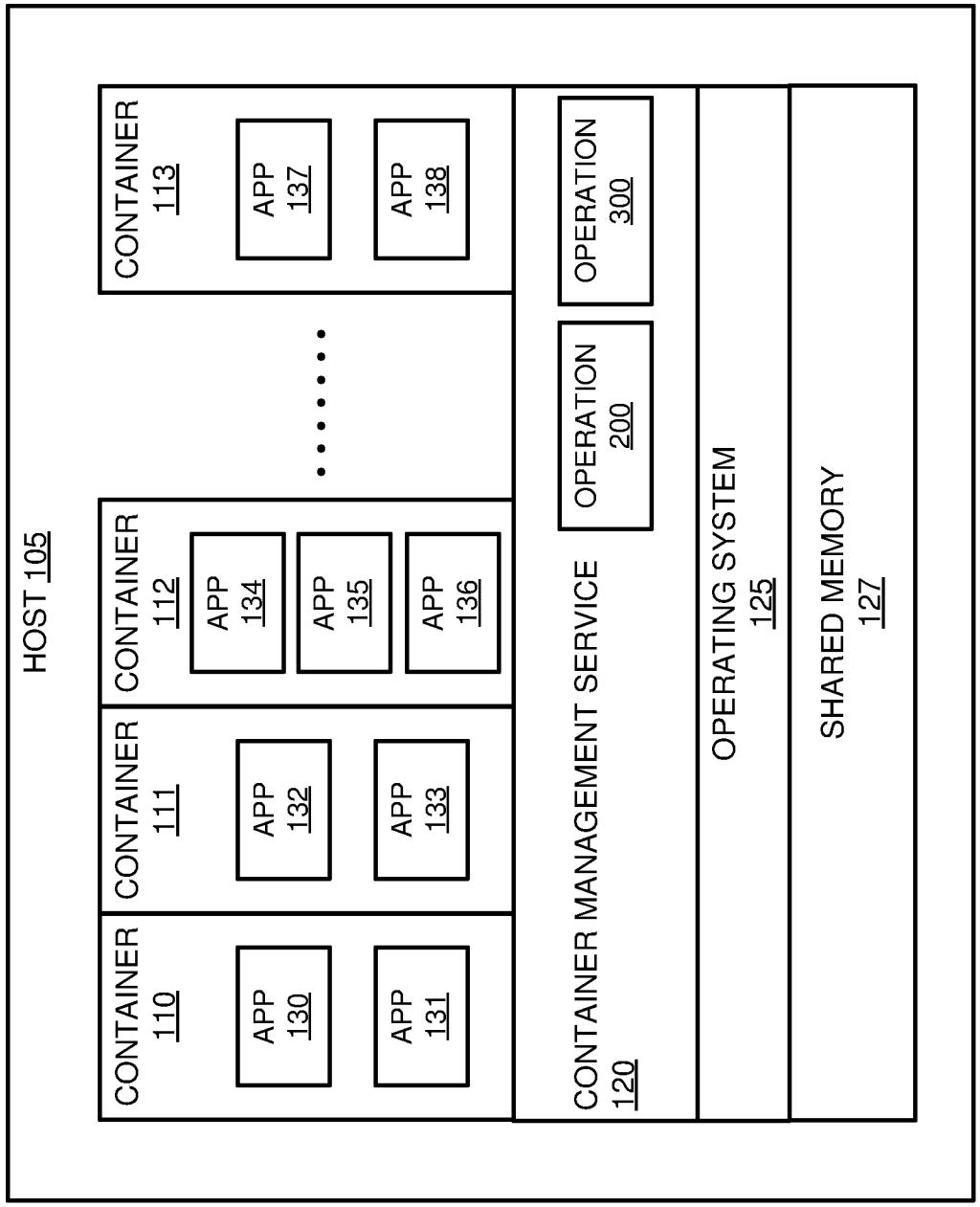
FIG. 1 illustrates a computing environment to manage inter-process communications (IPCs) for containers according to an implementation.

The various examples disclosed herein provide enhancements for managing inter-process communications (IPCs) in a container environment. In particular, containers each include files, environmental variables, and libraries of one or more applications that can be segregated from processes in other containers operating on the same host. This host may comprise a physical host or may comprise a virtual machine in some implementations. To provide the segregation between containers, a container management service may operate as part of the host operating system, or alongside the host operating system, to manage resources provided to each of the containers (processing, memory, and the like) and manage communications of each of the containers. These containers may comprise Docker containers, Linux containers, or some other similar type of container capable of sharing host resources, such as kernel resources of the host operating system and any allocated shared binaries. The containers may include their own identifier space and file structure, and may be allocated separate virtual network interfaces on the host system.

In many implementations, applications within the containers may require IPCs that are used to communicate data from one application to another application on a computing system. These IPCs may be used for copy/paste operations, file mapping operations, data exchange operations, or for a variety of other operations. As an example, a first application may initiate a "copy" command that is used to place or store an object in a memory location on the host. To copy the object, the application may use an application programming interface (API) command, which is identified by the operating system to place the object in a memory location. Once stored, a second application may supply a "paste" command that can be used to retrieve the object from the memory location and use the object in the second application. However, as containers may require security between applications operating on a host to ensure that an application cannot improperly access the data of another application, the container management service may be used to segregate the IPC objects.

In at least one implementation, responsive to a request of an application in a first container to generate a IPC object, the container management service may detect a first identifier for the IPC object and translate the first identifier to a second identifier based at least on an identifier associated with the first container. Once the second identifier is generated for the object, the object may be placed in a storage memory location using the second identifier, such that the object may only be accessed by applications in one or more containers configured to access IPC objects from the first container. Referring to the "copy/paste" example provided above, this would ensure that an application operating in an improper container could not "paste" data copied from the first container. Rather, when a request is generated for the object using the first object identifier from an application in the first container or an application in another approved container, the container management service may identify the request, translate the first identifier to the second identifier for retrieval of the object, and provide the object to the requesting application in accordance with the first identifier.

In some examples, the containers deployed for a host system may be deployed as part of a remote application service. This service may include one or more host computing systems (physical or virtual machines) that permit users to login to the service via a broker and be provided with a remote connection to the required applications. To provide the required applications, storage volumes, such as virtual machine disks (VMDKs), virtual hard disks (VHDs), or some other similar storage volume may be made available to the host, wherein the storage volumes store the required application container images. To make the volumes available, the volumes may be mounted to the host computing system prior to, or in response to, a requirement for a set of applications. For example, when a user logs into the service, the service may determine required applications, and initiate an attach process to mount one or more storage volumes that store the required containers for the applications. These applications may be stored locally on the physical computing system for the host, or may be stored remotely on a second computing system coupled via a network. Once the volumes are mounted, containers may be deployed from the storage volumes to provide the required applications, wherein the containers may be segregated from other containers operating on the same host using the IPC operations described herein.

FIG. 1 illustrates a computing environment 100 to manage IPCs for containers according to an implementation. Computing environment 100 includes host 105, containers 110-113, container management service 120, operating system 125, and shared memory 127. Containers further includes files, libraries, and variables for applications 130-138, wherein the applications may comprise productivity applications, digital media editing applications, development applications, or some other similar application, including combinations thereof. Container management service 120 provides operations 200 and 300 further described in FIGS. 2 and 3 below, and although illustrated as operating alongside operating system 125, it should be understood that container management service 120 may provide operations as part of operating system 125. In some implementations, containers 110-113 may comprise Docker containers, Linux containers, or some other similar container capable of sharing resources of host 105, such as operating system kernel resources of host 105.

In operation, containers 110-113 are instantiated on host 105 to provide various operations and functionality. These containers may share the kernel of operating system 125, but are provided various memory and processing resources, such that the containers may operate independently and in some examples without knowledge of another container operating on the same host. In the present example, to assist the management of containers 110-113, container management service 120 is provided that can be used to monitor for various API calls to the operating system 125. These API calls may be used for IPCs, such as copy/paste IPCs, compound document IPCs, file mapping IPCs, or any other type of IPC. Once an API call is detected by container management service 120, container management service 120 identifies an IPC object for the call and an identifier associated with the object. After identifying the object, container management service 120 may modify the identifier associated with the object and store the object in shared memory 127. This modification of the identifier associated with the IPC object permits IPCs for a first container to be separated from IPCs of other containers operating on host 105.

In some implementations, multiple instances of the same application may be executed in separate containers. For example, a word processing application may be represented as application 130 and a separate word processing application may be represented as application 132. As a result, if a "copy" IPC object was created by application 130, it may be undesirable for the data to be "pasted" by application 132. To prevent this interaction, container management service 120 is provided to ensure that the IPC operations of applications 130 and 132 are separated such that the objects are not accessible by the applications on separate containers. Thus, even if application 130 and application 132 each used the same object identifier for their respective IPCs, container management service 120 may be used to obscure the identifier, such that when the objects are stored in shared memory 127, the objects do not interfere with one another.

In at least one example, users, via console computing devices, may be remotely provided with access to applications in one or more of the containers. For example, a first user may be communicatively coupled to host 105 and provided with a remote desktop that includes applications in containers 110-111, while a second user may be communicatively coupled to host 105 and provided with the applications in container 112. Accordingly, the IPC operations described herein may be used to ensure that IPC objects for containers 110-111 are maintained separate from IPC objects from container 112.

In some implementations, containers 110-113 may be made available on host 105 via one or more application storage volumes that store the containers. These application storage volumes may comprise virtual machine disks VMDKs, VHDs, or some other similar storage volume. In attaching volumes to host 105, application storage volumes may be identified that correspond to applications for a user of host 105. For example, if a user required a suite of productivity applications, then one or more storage volumes may be identified that are associated with the suite of applications. This determination of applications may be made by an application service, wherein the user may login to the application service, and be provided with a remote connection to host 105 with the corresponding attached applications. Once the applications are identified, the application attach service may initiate a process to mount the volumes to the available host for the end user, and once mounted, permit the execution of the containers from the one or more mounted volumes. In some examples, mounting a volume to a host virtual machine or host physical machine may include providing an access path and mount point for the volume to the virtual machine, which may comprise an internet protocol (IP) address, a directory name, a file name, or any other path information to access the contents of the particular volume.

As an example, referring to host 105, containers 110-111 may be made available host 105 via a single mounted virtual disk file, wherein the applications may be associated with a user allocated to host 105. Once mounted, either prior to or in response to the user requesting the applications, containers 110-111 with applications 130-133 may be executed on host 105 to provide the desired operation for the end user. In many implementations, these virtual disks that store the containers may comprise read-only volumes, wherein the user is unable to modify the files and other objects within the read-only volume.

In some implementations, in addition to the read-only volumes with applications on the host, other user volumes, such as VMDKs, or VHDs, may be mounted to the host that provide read/write permissions, whereas the containers with the applications may only provide read operations. Consequently, if the first user assigned to containers 110-111 were to make a change to an application in container 110, such as a registry modification or changes to a file associated with an application, the changes may be stored in the user specific volume rather than the application container. To ensure that the proper registry or file data is read for the application, container management service 120 may be used to set a priority for data requests from the containers. In particular, when a request is generated by the application in container 110, container management service 120 may determine whether the file or registry object has been stored in the user volume, whether the file or registry object is stored with the application data in the application container, or whether the file or registry object is stored locally on the host (such as with the operating system kernel). For example, if a gaming application were to request a registry object, container management service 120 would first determine if a user registry object were stored in the user volume, second determine if the registry object were stored with the application container, and lastly determine if the registry object were stored locally on the host. Consequently, container management service 120 may be responsible for merging the file structure of the host operating system and any locally installed applications with the files, directories, and registry objects from the user volumes and application containers.

The remote connection between the containerized applications on the host and the end user devices can be implemented using a desktop remoting technology, such as Remote Desktop Services (RDS), Virtual Desktop Infrastructure (VDI), Desktop-as-a-Service (DAAS) or the like. Using such desktop remoting technologies, a user can be allowed to access a remote desktop or application(s) executing on the host over a remote network connection, such as a WAN connection. The host, which may comprise a virtual machine in some implementations, is executed in a data center remotely located with respect to the end user device. When the end user device is used to access the host and containers associated with the user of the device, the device may communicate with the host using a remote display protocol such as remote desktop protocol (RDP), PC-over-IP (PCoIP), Blast, virtual network computing (VNC), or the like. Using such a remote desktop protocol, the user can interact with the applications running on the host, such that only the display, keyboard, and mouse information is communicated with the end user device.

When the end user device is accessing the containers using a remote desktop protocol, the graphical user interface (GUI) of the desktop is generated at the host and the GUI image data is then encoded and transmitted over the network to the client device, where it is decoded and displayed to the user. For example, the framebuffer pixel data produced by the applications operating on the host may be encoded using a codec, such as H264, and transmitted over an Internet connection to the end user device, where the data is decoded and rendered in a window displayed on the screen of the end user device. Any user input information, such as keyboard and mouse events detected over the window on the end user device, are transmitted from the device to the host over the network connection, where it may in turn cause various updates to applications and/or desktop provided to the user. In this manner, the user is able to view the GUI of the applications and/or desktop and interact with it as if the was actually running on the local end user device.

FIG. 2 illustrates an operation 200 of container management service 120 to provide IPCs according to an implementation. The processes of FIG. 2 are referenced parenthetically in the paragraphs that follow with reference to the systems and elements of computing environment 100 of FIG. 1.

As depicted, operation 200 includes identifying (201) a request to generate an IPC object by an application of a first container. For example, a text editing application executing as application 131 on container 110 may initiate a copy operation on text of a text document. In response to the copy selection, a IPC function may be initiated wherein the function may be identified as a request by container management service 120. Accordingly, rather than being identified by operating system 125 as would normally occur for an application operating outside of a container, container management service 120 may be used to process IPC objects when they are received from applications 130-138 of containers 110-112.

After the request is identified for the application, operation 200 further modifies (202) an identifier for the IPC object from a first identifier to a second identifier. For example, referring again to the copy operation from a text editing application, the application may provide the copied text as an object with an identifier "FOO." Responsive to identifying the object, a second identifier may be identified such as "CONATINERID_FOO," wherein the second identifier associates the object with container 110 and or a group of containers that includes container 110. Once the second identifier is determined, the IPC object may be stored (203) using the second identifier in shared memory 127, wherein shared memory 127 may include dynamic random access memory (DRAM), solid state memory, or some other similar storage memory. By storing the object with the second identifier, it prevents other applications, that are executing on other containers from accessing the object. Thus, if a second application operating in container 113 were also using the "FOO" identifier for an object it would not identify the object with the new identifier "CONTAINERID_FOO."

FIG. 3 illustrates an operation 300 of container management service 120 to provide IPCs according to an implementation. Operation 300 is a continuation of operation 200 described in FIG. 2. The processes of FIG. 3 are referenced parenthetically in the paragraphs that follow with reference to the systems and elements of computing environment 100 of FIG. 1.

As depicted, once an IPC object is stored in shared memory 127, container management service 120 may identify (301) a request for IPC object using a first identifier. Referring again to the copy example with object identifier "FOO," A request may be generated from an application that uses the identifier "FOO" for the request. Responsive to the request, container management service 120 may determine (302) the second identifier for the IPC object based on the container associated with the request. Once identified, the IPC object is accessed (303) using the second identifier and provided to the application associated with the request in accordance with the first identifier.

Again, referring to an example IPC object stored from application 131, when either application 130 or application 131 request the object, the request may again use the first identifier "FOO." After identifying the request, container management service 120 may translate the first identifier into the second identifier, and access the IPC object using the second identifier. Once accessed, the object may be provided to the requesting application as the first identifier. Consequently, to ensure that applications from other containers 111-113 cannot access an IPC object that is intended for use by applications 130-131, container management service 120 employs a unique identifier for container 110. This permits the applications within each of the containers to use the same IPC identifiers, and rely on container management service 120 to provide the segregation operations of generating the second identifiers.

While demonstrated in the previous example as segregating IPCs for each individual container, it should be understood that multiple containers may be permitted share IPCs. For example, an administrator may desire a configuration of container management service 120 that permits applications on containers 110-111 to share IPCs. As a result, when an IPC object is stored using a second identifier, applications from both container 110 and container 111 may provide a first identifier that, in turn, may be translated to retrieve the stored object using a second identifier. Advantageously, this configuration may permit a user that requires multiple containers to provide IPC objects between the containers. Accordingly, in at least one implementation, when multiple users are allocated to a host, the containers for each of the users may be separated at least in part based on the IPC operations described herein.

Figure 4B:
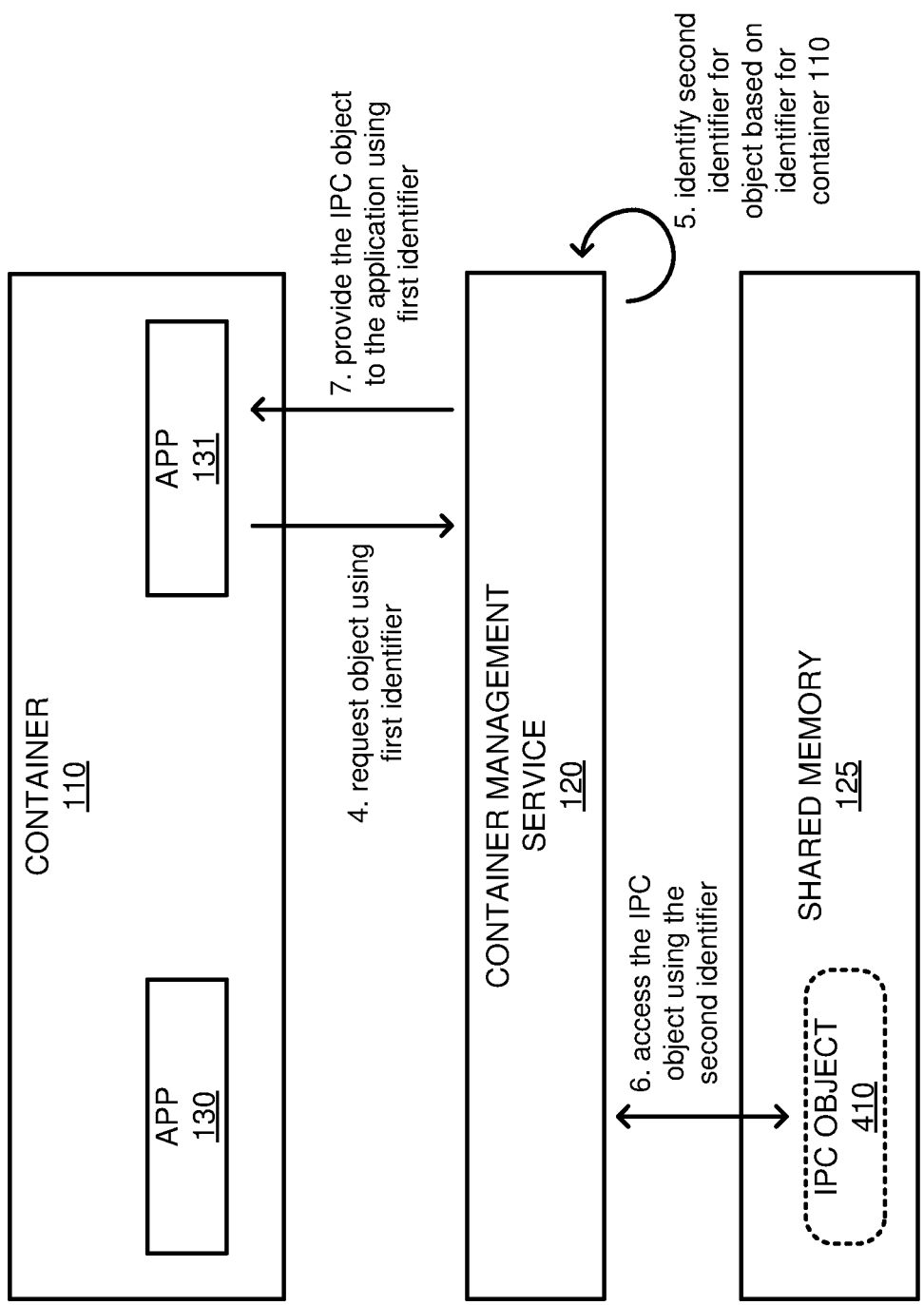
FIG. 4B illustrates an operational scenario of communicating an IPC object according to an implementation.

FIGS. 4A and 4B illustrate an operational scenario of communicating an IPC object according to an implementation. FIGS. 4A and 4B include systems and elements of computing environment 100 of FIG. 1. In particular, FIGS. 4A and 4B provide an example of an IPC for applications 130 and 131 of container 110. Containers 111-113 and operating system 125 have been omitted for the sake of clarity.

Referring first to FIG. 4A, as applications 130 and 131 execute in container 110, application 130 may generate, at step 1, a IPC object that uses a first identifier. This IPC object may be generated in response to a copy command with application 130, in response to a memory share command for application 130, or in response to any other IPC operation. Once generated, the object is identified by container management service 120, wherein container management service 120 may operate alongside or as part of the operating system of the host computing system. After identification, container management service 120 modifies, at step 2, the first identifier into a second identifier for container 110. In some implementations, this modification may include translating the first identifier from a name that is generally used by applications of the same type of application 130 to a name that is unique to the particular instance of the application (or container). For example, multiple applications each executing in separate containers may use the same identifier when a IPC object is required. To separate the objects for the containers, a translation of the name may be required to ensure that the IPCs of each of the containers remain separated. This would permit separate text editing application instances operating in separate containers from improperly accessing a IPC object.

Once the second identifier for the IPC object is determined, container management service 120 may store, at step 3, IPC object 410 in the memory system using the second identifier. In some implementations, as the object is stored in shared memory 125, which may be a location in a memory system capable of access by multiple applications operating on a host, a notification may be provided by the operating system or container management service 120 to one or more applications that correspond to the IPC. In other implementations, no notification is required, and the other applications may request objects as they are required (e.g. copy/paste operation).

Turning to FIG. 4B, after IPC object 410 has been stored in shared memory 125, application 131, which shares container 110, may request, at step 4, IPC object 410 using the first identifier. For example, if application 130 used an identifier "BAR" in generating the object, application 131 may similarly use the identifier "BAR" in making a request for the object. Once the request is identified by container management service 120, container management service 120 may identify, at step 5, a second identifier for the corresponding object based on the identifier for container 110.

As described above, to separate IPC objects across containers, container management service 120 may be used to manage permissions and unique identifiers for IPC objects across multiple containers. Here, because application 131 is in the same container as application 130 that generated IPC object 410, container management service 120 will determine that the second identifier should be the same as the second identifier determined when storing IPC object 410. Using the example of the first identifier "BAR," a second identifier for the object may comprise "CONTAINERID_BAR," wherein the container identifier may be unique to container 110.

Once the second identifier is determined for IPC object 410, the object may be accessed, at step 6, using the second identifier. Container management service 120 may then provide, at step 7, the IPC object to the application using the first identifier. In this way, container management service 120 may act as a transparent intermediary for IPCs of applications operating in containers. Thus, if another container operating on the same host were to make a request for an IPC object with the identifier "BAR," container management service 120 would identify the container associated with the request and determine a different identifier for the IPC object than was used in storing the object for container 110.

While demonstrated in the previous example as storing and retrieving an IPC object with applications in the same container, it should be understood that container management service 120 may be used to group containers together and permit multiple containers to share IPC objects. For example, when application 130 generates an IPC object using a first identifier and the object is stored in shared memory 125 using a second identifier, a second application in a second container may provide a request for the object using the first identifier and be provided with object stored by application 130.

Figure 5:
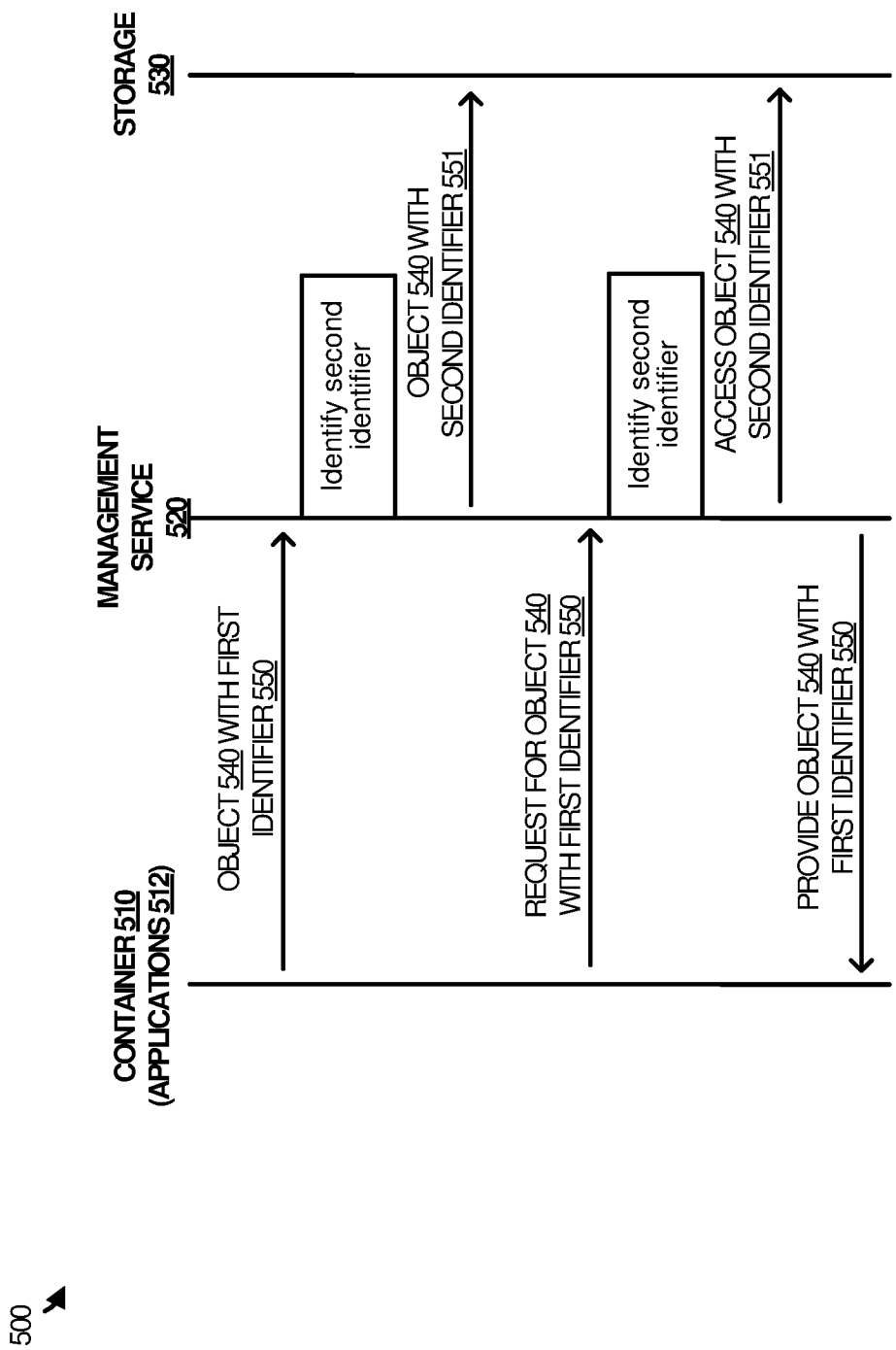
FIG. 5 illustrates a timing diagram for storing IPC objects according to an implementation.

FIG. 5 illustrates a timing diagram 500 for storing IPC objects according to an implementation. Timing diagram 500 includes a container 510 with applications 512, management service 520, and storage 530. Management service 520 is representative of a container management service that operates alongside or part of an operating system that provides a platform for one or more containers.

In operation, an application of applications 512 may generate a IPC object 540 for a IPC communication, wherein the IPC object is associated with a first identifier 550. In response to the generation by the application, management service 520 identifies a second identifier for IPC object 540 based on the identity of container 510, and stores object 540 using the second identifier 551 in storage 530. In some implementations, in determining the second identifier, management service 520 may use one or more data structures that can be used to identify and/or modify the first identifier provided by the application.

Once IPC object 540 is stored in storage 530 a second request is provided from a second application of applications 512 in container 510. For example, if the IPC object were stored using a "copy" operation, then a request may be generated on a paste operation. In response to identifying the request, which uses the first identifier 550, management service 520 will identify the second identifier associated with the request. In some examples, one or more containers may be associated in a container group, wherein management service 520 may permit applications executing in the same group to identify and be provided with IPC objects generated by other applications within the same group. After the second identifier is determined for the request, management service 520 will access object 540 with second identifier 551. Once accessed, the object may be provided to the requesting application in container 510 using the first identifier.

Although illustrated in the example of FIG. 5 as storing and retrieving an IPC object using applications from a single container, it should be understood that management service 520 may be used to permit applications across multiple containers to provide IPCs. For example, when an IPC object is stored by a first container, an application on a second container may request and receive the object based on a container group configuration.

Figure 6:
FIG. 6 illustrates a data structure for managing IPC object identifiers according to an implementation.

FIG. 6 illustrates a data structure 600 for managing IPC object identifiers according to an implementation. Data structure 600 includes columns for group identifiers 610, and object identifier additions 630. Group identifiers 610 are representative of an identifier for one or more containers that may share and communicate IPC objects. These groups may be defined by an administrator of a host computing system in some implementations.

In operation, a container management service may identify IPC object generations and IPC requests, wherein each of the generations or requests may use a first identifier for a IPC object. For example, when an IPC object is generated, the container management service may identify the generation from one of the containers. In response to identifying the generation, container management service may apply data structure 600 to determine a second identifier for the IPC object. As an illustrative example, if a container of group A 620 generated a IPC object with a first identifier "FOO," then object identifier additions 630 would be used to generate a new identifier for the object. In particular, the addition "GROUP_A_" would be added to "FOO" to generate the second identifier "GROUP_A_FOO." Once the new identifier is generated, the object may be stored in a storage system for access by a second application in container group A 620.

Although illustrated as a single table in the present implementation, it should be understood that a container management service may use any number of data structures, such as tables, trees, linked lists, or any other similar data structure. Further, while demonstrated with two columns to determine and translate IPC object identifiers, it should be understood that any number of columns may be used to provide the same operation.

Figure 7:
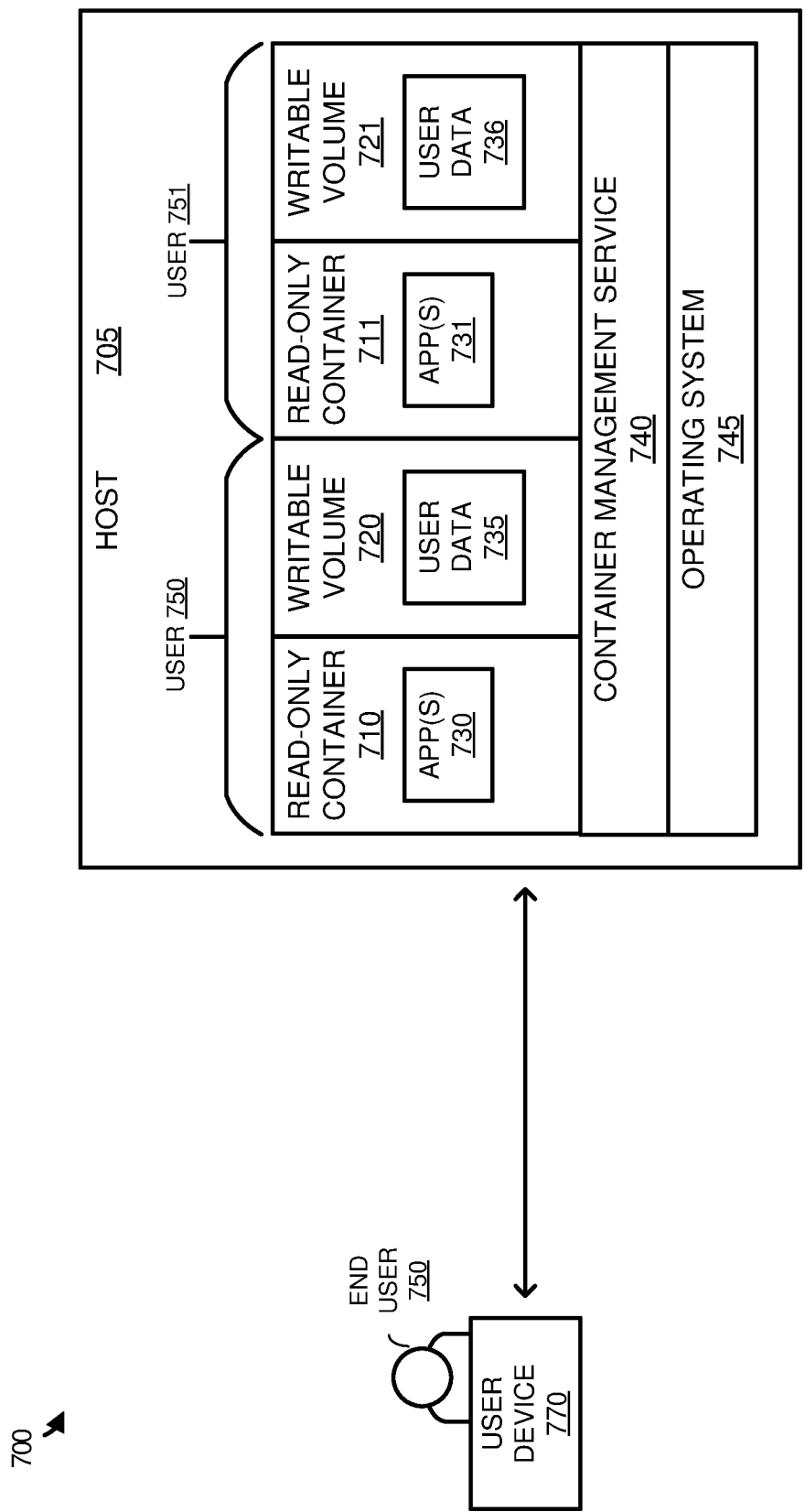
FIG. 7 illustrates a computing environment to provide remote applications to end user devices according to an implementation.

FIG. 7 illustrates a computing environment 700 to provide remote applications to end user devices according to an implementation. Computing environment 700 includes user device 770, end user 750, and host 705. Host 705 further includes read-only containers 710-711, writable volumes 720-721, container management service 740, and operating system 745. Containers 710-711 are made available on host 705 via read-only application storage volumes, wherein the containers include files, directories, and registry keys for application(s) 730-731. Writable volumes 720-721 comprise read and write volumes that are capable of storing files and registry objects for end users that connect to host 705.

In operation, end users, such as end user 750, may use an end user device to request and receive remote applications from host 705. In particular, user device 770 may transfer a request to host 705, or a broker service associated with host 705, and in turn receive a remote connection to one or more applications associated with the user. These applications may be presented solely as application windows, or as a desktop where the user may have access to the operating system and other software stored thereon. Here, the applications are provided for end user 750 using container 710, and writable volume 720. To ensure that segregation is provided between users that share host 705, container management service 740 is provided, which may operate alongside or as part of operating system 745. Container management service 740 is used to provide the IPC object segregation operations described herein, and is further used to merge files and registry objects stored locally on the host, the application containers, and the user data volumes.

In particular, when user device 770 requests a remote session, container 710 is provided (or launched/initiated) with the appropriate applications for end user 750. Additionally, writable volume 720 is provided (or mounted) to host 705 to provide individualized user data for end user 750. This user data may include files and registry changes introduced from the user while executing the associated applications. For example, while executing a gaming application, the user may modify a setting within one of the applications. Rather than storing the modification within the application container, the modification may instead be stored with user data 735 of writable volume 720. This writable volume may then be preserved (stored in a repository) when the user logs out of the remote session, and re-initiated when the user requests a new session. To ensure that user data 735 is prioritized over the data from container 710 and/or locally stored on host 705, container management service 740 may be used to prioritize user data 735, such as files and registry objects, over application data for applications 730 and any files and registries locally stored on host 705. Similarly, container management service 740 may prioritize application data for applications 730 over any files or registry objects locally stored on host 705. As a result, when an application generates a request for access to a particular file, container management service 740 may determine if a version of the file is located in user data 735. If not available, then container management service 740 may determine if the file is stored with data for applications 730 on container 710. If not available in container 710, then the file may be identified as locally stored on host 705, such as on the C: drive for a Microsoft Windows host. Accordingly, container management service 740 may be responsible for integrating the data from container 710 and writable volume 720 with the locally stored data of host 705 to provide the desired operations of end user 750. Further, container management service 740 may be used to segregate the data (files, directories, etc.) of read-only container 710 and writable volume 720 for user 750 from read-only container 711 and writable volume 721 for user 751. This operation permits hosts 705 to provide segregated application operations for user 750 and 751.

Although illustrated as a single application container and single user data container provided to each of the users, it should be understood that any number of application containers and user data volumes may be initiated or deployed for each of the users. Further, while demonstrated with a single host in the present implementation, it should be understood that a plurality of real or virtual hosts may be deployed to support user requests. In particular, a broker may receive connection requests (including credentials such as usernames, passwords, and the like) from the end user devices and determine a host to support each of the requests. Once a host is identified, the appropriate containers may be identified and deployed to support the requests. The users may then be provided with security and addressing information to provide a remote connection with the associated host.

In some implementations, the read-only containers that supply the applications for the users may be provided to host 705 via virtual disks, such as VMDKs, VHDs, or some other similar disk file that are mounted to host 705. These virtual disks may include container images that can be deployed for users on host 705, wherein the containers may comprise Docker containers, Linux containers, or some other similar containerized virtualization image. In some examples, the virtual disks may be mounted to host 705 prior to the user requesting the remote session, however, it should be understood that the virtual disks may be mounted responsive to a user requirement.

In addition to the volumes that contain the containers, user volumes may be mounted that provide read and write functionality for data such as files, directories, and registry objects that provide a unique environment to the end user. These files, directories, and registry objects may be updated to reflect user preferences for the associated applications, or may include files for use in the applications, such as images, text files, spreadsheets, and the like. The user data volumes may further be maintained or stored in a storage repository when a user ends a remote session, such that the data in the containers is available to be initiated on a host during the next login period for the end user. This storage repository may be local to the physical computing system of the host or provided via a network connection to the physical computing system of the host.

The remote connection between the containerized applications on the host and the end user devices can be implemented using a desktop remoting technology, such as Remote Desktop Services (RDS), Virtual Desktop Infrastructure (VDI), Desktop-as-a-Service (DAAS) or the like. Using such desktop remoting technologies, a user can be allowed to access a remote desktop or application(s) executing on the host over a remote network connection, such as a WAN connection. The host, which may comprise a virtual machine in some implementations, is executed in a data center remotely located with respect to the end user device. When the end user device is used to access the host and containers associated with the user of the device, the device may communicate with the host using a remote display protocol such as remote desktop protocol (RDP), PC-over-IP (PCoIP), Blast, virtual network computing (VNC), or the like. Using such a remote desktop protocol, the user can interact with the applications running on the host, such that only the display, keyboard, and mouse information is communicated with the end user device.

When the end user device is accessing the containers using a remote desktop protocol, the graphical user interface (GUI) of the desktop is generated at the host and the GUI image data is then encoded and transmitted over the network to the client device, where it is decoded and displayed to the user. For example, the framebuffer pixel data produced by the applications operating on the host may be encoded using a codec, such as H264, and transmitted over an Internet connection to the end user device, where the data is decoded and rendered in a window displayed on the screen of the end user device. Any user input information, such as keyboard and mouse events detected over the window on the end user device, are transmitted from the device to the host over the network connection, where it may in turn cause various updates to applications and/or desktop provided to the user. In this manner, the user is able to view the GUI of the applications and/or desktop and interact with it as if the was actually running on the local end user device.

Figure 8:
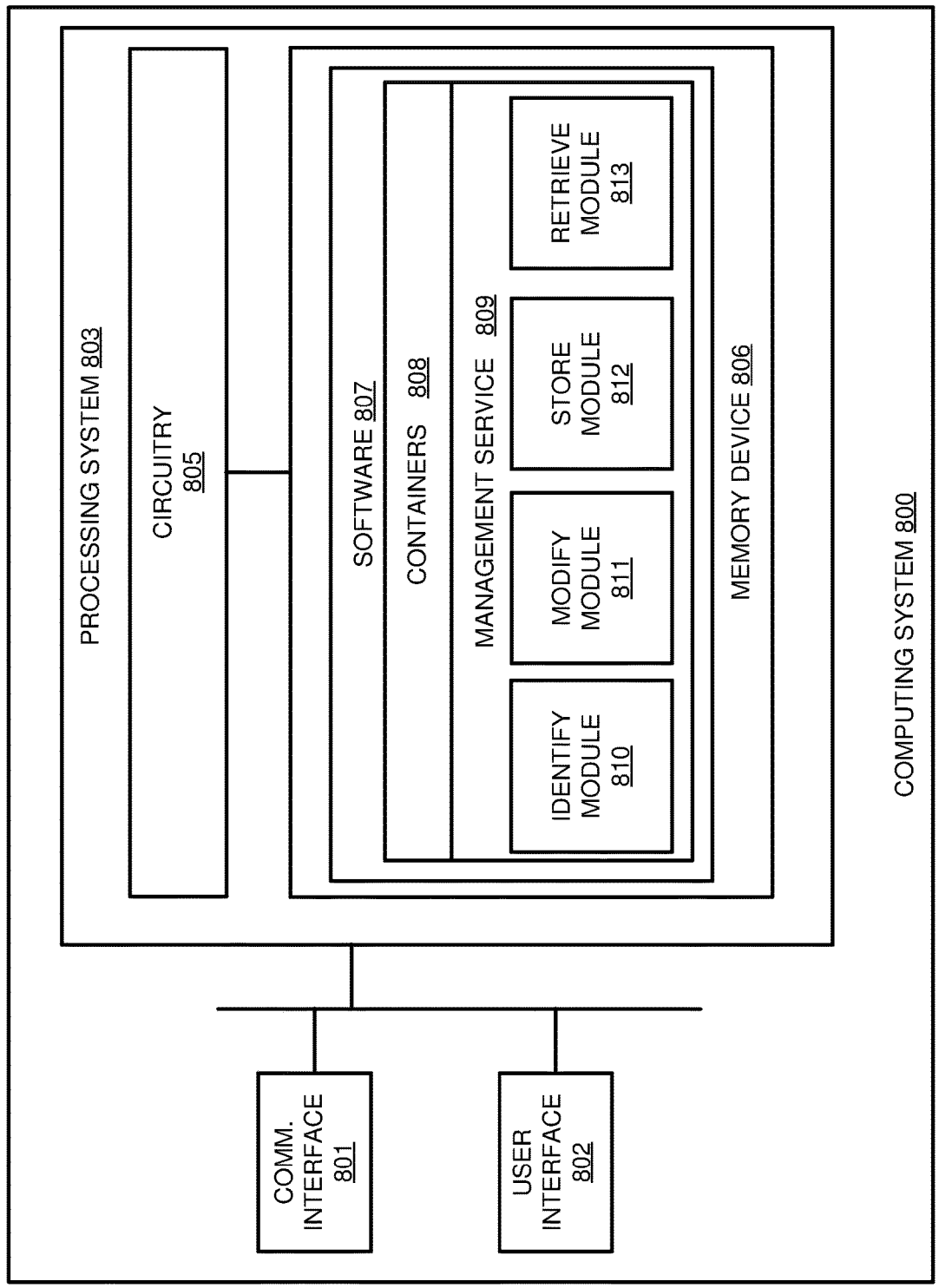
FIG. 8 illustrates a computing system to manage IPC object identifiers according to an implementation.

FIG. 8 illustrates a computing system 800 to manage IPC object identifiers according to an implementation. Computing system 800 is representative of any computing system or systems with which the various operational architectures, processes, scenarios, and sequences disclosed herein for a host computing system may be implemented. Computing system 800 is an example of host 105 from FIG. 1, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity. Computing system 800 may comprise a serving computing system, a desktop computing system, or some other type of computing system.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some implementations.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes containers 808 and management service 809, wherein management service 809 includes identify module 810, modify module 811, store module 812, and retrieve module 813, although any number of software modules may provide the same operation. Management service 809 is representative of container management service 120, management service 520, and container management service 720. Operating software 807 may further include an operating system, utilities, drivers, network interfaces, applications, or some other type of software. When executed by processing circuitry 805, operating software 807 directs processing system 803 to operate computing system 800 as described herein.

In operation, containers 808 execute on computing system 800 and share resources provided by a kernel operating system for containers 808. During the execution of the containers, which each may include one or more applications, identify module 810 directs processing system 803 to identify a generation of an IPC object by an application in one of the containers. In response to identifying the creation of the object, which is associated with a first identifier, modify module 811 directs processing system 803 to determine a second identifier associated with the IPC object based on the source container for the IPC object. In particular, to prevent improper access to IPC objects, unique identifiers may be associated with the object to prevent applications from other containers from improperly accessing an IPC object. For example, a text editing application in a first container may implement a "copy" operation to copy text from the document. By providing a unique identifier with the IPC object, which includes the copied text, applications in other containers may be incapable of retrieving the object.

Once the second identifier has been determined for the object, store module 812 directs processing system 803 to store the object in a shared memory location of memory device 806. Additionally, in some implementations, store module 812 may notify another application in the same or a different container that an IPC has occurred. This may include providing the first identifier for the IPC object to the other application.

After the object is stored, identify module 810 further directs processing system 803 to identify a request for the object using the first identifier. Once the request is identified, modify module 811 directs processing system 803 to determine the second identifier associated with the IPC object based on a container for the application that generated the request. In some implementations, computing system 803 may include one or more data structures that maintain identifier information for the IPC objects. Accordingly, responsive to a request with a first identifier, computing system 803 may use the data structures to determine a second identifier associated with the first identifier provided in the request. After determining the second identifier, retrieve module 813 directs processing system 803 to access the IPC object in memory device 816 using the second identifier, and provide the IPC object to the requesting application as the first identifier.

In many implementations, multiple applications across containers 808 may use similar IPC identifiers when making communications. For example, if multiple instances of a text editing application were operating on computing system 800, each instance of the application may use a similar identifier when performing a copy operation. To ensure that each instance does not affect the other instances, management service 809 may be used to segregate the IPC objects for each of the instances. Thus, a copy command from a first version of the text editing application would not affect a copy command from a second version of the text editing application operating as a separate container.

Although not illustrated in the example of FIG. 8, it should be understood that the containers may operate using a physical host operating system or a virtual host operating system. For example, containers 808 may operate using kernel resources provided from an operating system of a virtual machine that may operate alongside one or more other virtual machines on a physical host computing system. Thus, management service 809 may provide the segregation operations described herein for containers that operate on a virtual machine on a physical computing device, such as a server.

In some implementations, in addition to the IPC object segregation operations, management service 809 may further be used to integrate file structures for containers 808 with user attached volumes. In particular, one or more containers may be used to provide particular operations for an end user or organization. These containers may include application containers, that store files, directories, and registry keys for applications, wherein the containers are made available via one or more volumes, such as VMDKs or VHDs. In addition to the containers, user volumes may be made available on the host, which are capable of read and write operations to store files and registry keys for user operations with the applications. To integrate the data from each of the containers, management service 809 may, in some examples, direct processing system 803 to store user data in the one or more user volumes. Once user data is generated, a request from an application in one of the containers may be identified by management service 809, and may service the request based on the following priority. First, management service 809 may determine whether a requested version of the file is stored in a user data volume, and if a version is stored, that file (or registry object) may be used to service the request. In contrast, if a file is not available, then management service 809 may determine if a version is available within an application container, and if available may use the version of the file to support the request. If the file fails to exist within the application containers or the user data volumes, then the management service 809 may use a file locally stored on the host.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing inter-process communications (IPCs) in a containerized application environment, the method comprising:
   identifying a generation request to generate an IPC object using a first identifier;
   translating the first identifier of the IPC object to a second identifier based on a container associated with the generation request;
   storing the IPC object in the memory system using the second identifier;
   identifying, from an application executing in the container on a host, a request for the IPC object using the first identifier for the IPC object, wherein the first identifier is used by the application in the container and one or more other applications executing in one or more other containers on the host;
   translating the first identifier to the second identifier associated with the IPC object based on the container for the application, wherein the second identifier is unique to at least the container and wherein requests from at least a portion of the one or more other containers using the first identifier are translated to one or more other unique identifiers associated with one or more other IPC objects located in the memory system with the IPC object;
   accessing the IPC object in the memory system using the second identifier; and
   providing the IPC object to the application.

2. The method of claim 1, wherein the container for the application and the container associated with the generation request comprise the same container.

3. The method of claim 1, wherein the container for the application and the container associated with the generation request comprise different containers.

4. The method of claim 1, wherein identifying the generation request to generate the IPC object using the first identifier comprises identifying, from a first application, the generation request to generate the IPC object using the first identifier.

5. The method of claim 1 further comprising transferring a notification to the application indicating the IPC object has been stored in the memory system.

6. The method of claim 5, wherein the notification indicates the first identifier for the IPC object.

7. The method of claim 1 further comprising:
   identifying, from a second application of the one or more other applications, a second request for a second IPC object using the first identifier;
   determining a third identifier associated with the second IPC object based on a container for the second application, wherein the second application executes in a different container than the application;
   accessing the second IPC object in the memory system using the third identifier; and
   providing the second IPC object to the second application.

8. A computing apparatus comprising:
   one or more non-transitory computer readable storage media;
   a processing system operatively coupled to the one or more non-transitory computer readable storage media;
   program instructions stored on the one or more non-transitory computer readable storage media to manage inter-process communications (IPCs) for containers that, when read and executed by the processing system, direct the processing system to at least:
   identify a generation request to generate an IPC object using a first identifier;
   translate the first identifier of the IPC object to a second identifier based on a container associated with the generation request;
   store the IPC object in the memory system using the second identifier;
   identify, from an application executing in the container on a host, a request for the IPC object using the first identifier for the IPC object, wherein the first identifier is used by the application in the container and one or more other applications executing in one or more other containers on the host;
   translate the first identifier to the second identifier associated with the IPC object based on the container for the application, wherein the second identifier is unique to at least the container and wherein requests from at least a portion of the one or more other containers using the first identifier are associated with one or more other unique identifiers associated with one or more other IPC objects located in the memory system with the IPC object;
   access the IPC object in the memory system using the second identifier; and
   provide the IPC object to the application.

9. The computing apparatus of claim 8, wherein the container for the application and the container associated with the generation request comprise the same container.

10. The computing apparatus of claim 8, wherein container for the application and the container associated with the generation request comprise different containers.

11. The computing apparatus of claim 8, wherein the program instructions to identify the generation request to generate the IPC object using the first identifier direct the processing system to identify, from a first application, the generation request to generate the IPC object using the first identifier.

12. The computing apparatus of claim 8, wherein the program instructions further direct the processing system to transfer a notification to the application indicating the IPC object has been stored in the memory system.

13. The computing apparatus of claim 12, wherein the notification indicates the first identifier for the IPC object.

14. The computing apparatus of claim 8, wherein the program instructions further direct the processing system to:
   identify, from a second application of the one or more applications, a second request for a second IPC object using the first identifier;
   determine a third identifier associated with the second IPC object based on a container for the second application, wherein the second application executes in a different container than the application;
   access the second IPC object in the memory system using the third identifier; and
   provide the second IPC object to the second application.

15. The computing apparatus of claim 8, wherein the host comprises a virtual machine.

16. An apparatus comprising:
   one or more non-transitory computer readable storage media;
   program instructions stored on the one or more non-transitory computer readable storage media to manage inter-process communications (IPCs) for containers that, when read and executed by a processing system, direct the processing system to at least:

identify a generation request to generate an IPC object using a first identifier, wherein the first identifier is used by applications in a plurality of containers on a host;

translate the first identifier for the IPC object to a second identifier based on a container of the plurality of containers associated with the generation request;

store the IPC object in a memory system using the second identifier;

identify, from an application, a request for the IPC object using the first identifier for the IPC object;

translate the first identifier to the second identifier associated with the IPC object based on a container of the plurality of containers for the application, wherein the second identifier is unique to at least the container for the application and wherein requests from one or more other containers of the plurality of containers using the first identifier are translated to one or more other unique identifiers associated with one or more other IPC objects located in the memory system with the IPC object;

access the IPC object in the memory system using the second identifier; and provide the IPC object to the application.

17. The apparatus of claim 16, wherein the container for the application and the container associated with the generation request comprise the same container.

18. The apparatus of claim 16, wherein the container for the application and the container associated with the generation request comprise different containers.

* * * * *